US012423008B2

(12) United States Patent
Frolikov

(10) Patent No.: US 12,423,008 B2
(45) Date of Patent: Sep. 23, 2025

(54) READING A MASTER BOOT RECORD FOR A NAMESPACE USING A REGULAR READ OPERATION

(71) Applicant: Micron Technology, Inc., Boise, ID (US)

(72) Inventor: Alexei Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 73 days.

(21) Appl. No.: 17/726,436

(22) Filed: Apr. 21, 2022

(65) Prior Publication Data

US 2023/0342049 A1 Oct. 26, 2023

(51) Int. Cl.
*G06F 12/00* (2006.01)
*G06F 3/06* (2006.01)
*G06F 9/4401* (2018.01)

(52) U.S. Cl.
CPC .......... *G06F 3/0632* (2013.01); *G06F 3/0604* (2013.01); *G06F 3/0659* (2013.01); *G06F 3/0679* (2013.01); *G06F 9/4401* (2013.01)

(58) Field of Classification Search
CPC .... G06F 3/0632; G06F 3/0604; G06F 3/0659; G06F 3/0679; G06F 9/4401
See application file for complete search history.

(56) References Cited

U.S. PATENT DOCUMENTS

| 10,037,153 | B2 | 7/2018 | Sepulveda | |
|---|---|---|---|---|
| 10,223,254 | B1 | 3/2019 | Frolikov | |
| 2006/0195672 | A1* | 8/2006 | Inoue | G06F 3/0644 711/170 |
| 2006/0236399 | A1* | 10/2006 | Han | G06F 21/568 726/24 |
| 2008/0109589 | A1* | 5/2008 | Honda | G06F 12/0246 711/E12.008 |
| 2010/0205145 | A1* | 8/2010 | Eshita | G06F 3/0674 707/822 |
| 2016/0034211 | A1* | 2/2016 | Minamimoto | G06F 3/0674 711/102 |
| 2019/0146931 | A1* | 5/2019 | Frolikov | G06F 3/0679 713/193 |
| 2019/0265899 | A1 | 8/2019 | Frolikov | |
| 2020/0225869 | A1 | 7/2020 | Frolikov | |
| 2020/0411130 | A1 | 12/2020 | Frolikov | |
| 2021/0141910 | A1* | 5/2021 | Numata | G06F 21/40 |

* cited by examiner

*Primary Examiner* — Arvind Talukdar
(74) *Attorney, Agent, or Firm* — Greenberg Traurig

(57) ABSTRACT

Systems, methods, and apparatus related to memory devices. In one approach, a memory (e.g., NAND flash memory of a solid-state drive) is allocated to a namespace for use by a host device. Master boot record (MBR) data is written by a controller of the memory to an MBR region assigned to the namespace. Read circuitry is configured to read either of user data or MBR data in response to read commands received from the host device for addresses in the namespace. The user data or the MBR data is read using a regular read operation of the controller (e.g., without triggering any hardware exceptions that require significantly slower processing by firmware of the controller).

28 Claims, 9 Drawing Sheets

READING A MASTER BOOT RECORD FOR A NAMESPACE USING A REGULAR READ OPERATION

FIELD OF THE TECHNOLOGY

At least some embodiments disclosed herein relate to memory devices in general, and more particularly, but not limited to reading a master boot record for a namespace in a storage device using a regular read operation.

BACKGROUND

Typical computer storage devices, such as hard disk drives (HDDs), solid-state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid-state drives, and both in hybrid drives.

A standardized logical device interface protocol allows a host computer to address a computer storage device in a way independent from the specific media implementation of the storage device. For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

In one example of a storage device, a flash memory controller manages data stored in flash memory (e.g., NAND flash) and communicates with a computer device. In some cases, flash memory controllers are used in solid-state drives for use in mobile devices, or in SD cards or similar media for use in digital cameras.

Firmware can be used to operate a flash memory controller for a particular storage device. In one example, when a computer system or device reads data from or writes data to a flash memory device, it communicates with the flash memory controller.

When a storage device is powered up (e.g., after an intentional shut-down), it uses a booting process. As part of this booting, a controller of the storage device reads a master boot record from non-volatile memory. The master boot records contains data used to, for example, load an operating system into main memory (e.g., RAM) for a controller of the storage device.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
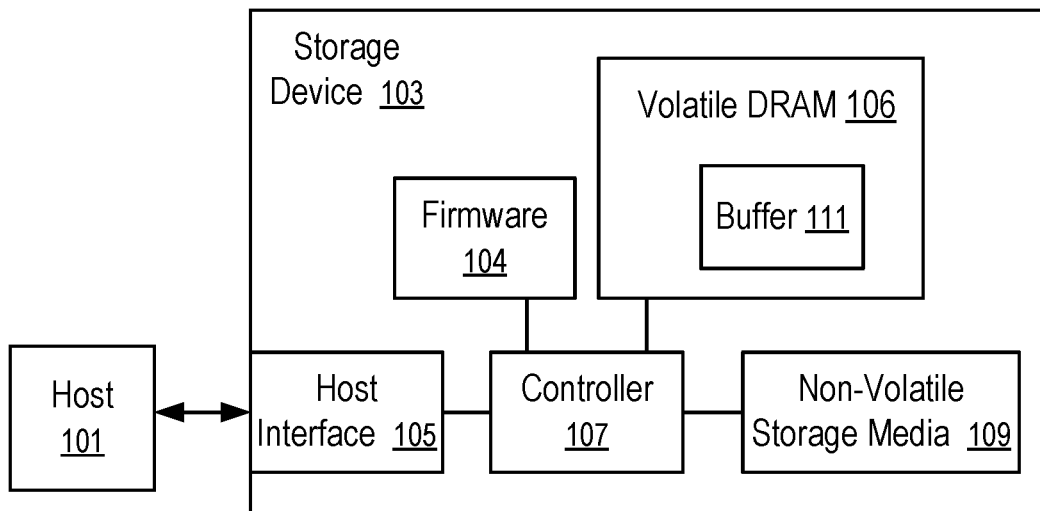
FIG. 1 shows a computer system having a storage device in which embodiments disclosed herein can be implemented.

The following disclosure describes various embodiments for reading a master boot record (MBR) enabled for a namespace residing in the memory of a storage device after reformatting the namespace to have a different sector size. At least some embodiments herein relate to reading an MBR in a flash memory device (e.g., a device using NAND flash memory) or a cross-point memory device (e.g., a device using phase change memory cells). The memory device may, for example, store data used by a host device (e.g., a computing device of an autonomous vehicle, or another computing device that accesses data stored in the memory device). In one example, the memory device is a solid-state drive mounted in an electric vehicle.

Physical memory elements of a storage device can be arranged as logical memory blocks addressed via logical block addressing. A logical memory block having a logical block address (LBA) is the smallest addressable memory unit; and each LBA address identifies a single logical memory block that can be mapped to a particular physical address of a memory unit in the storage device.

The concept of namespace for storage device is similar to the concept of partition in a hard disk drive for creating logical storages. Different portions of a storage device can be allocated to different namespaces and thus can have LBAs configured independently from each other within their respective namespaces. Each namespace identifies a quantity of memory of the storage device addressable via LBAs.

A same LBA can be used in different namespaces to identify different memory units in different portions of the storage device. For example, a first namespace allocated on a first portion of the storage device having n memory units can have LBAs ranging from 0 to n−1; and a second namespace allocated on a second portion of the storage device having m memory units can have LBA addresses ranging from 0 to m−1.

A host of the storage device may send a request to the storage device for the creation, deletion, or reservation of a namespace. After a portion of the storage capacity of the storage device is allocated to a namespace, an LBA in the respective namespace logically represents a particular memory unit in the storage media, although the particular memory unit logically represented by the LBA in the namespace may physically correspond to different memory units at different time instances (e.g., as in SSDs).

After creating a new namespace in memory, a master boot record can be assigned to the namespace (e.g., the MBR is enabled for the namespace as described for the Trusted Computing Group (TCG) Opal Storage Specification). Master boot record (MBR) data is written to an MBR region of the memory that is used for storing the master boot record. The MBR region can be located in a portion of the memory outside of the new namespace (e.g., the controller assigns or maps a range of blocks addressed using LBAs as the MBR region). In one example, the MBR data is written to another namespace of the memory. In one example, the MBR region is located in memory on a different die or chip from the memory having the namespace.

In some cases, such as for secure SSDs or other data storage devices that require authentication to access data stored in the device, the MBR data is written to the MBR region using a secure write command. In one example, the secure write command is a secure send/receive command (e.g., as used for the Trusted Computing Group (TCG) Opal Storage Specification).

In one example, at the time of initial manufacturing of the SSD, a namespace is formatted to have a certain sector size (e.g., 4K bytes per sector). A master boot record is assigned to (e.g., enabled for) the namespace, and MBR data of the master boot record is written to an MBR region of the SSD. For example, the MBR data is formatted to have the same sector size (e.g., 4K bytes per sector) as the namespace.

In some cases, at a later time after the initial manufacturing of an SSD, a namespace is reformatted to change the sector size to be either larger or smaller than the sector size used in the initial formatting. In one example, the sector size of the namespace is increased so that metadata can be stored along with user data in each sector (e.g., LBA block) of the namespace. The metadata may be, for example, signature and/or other data used to verify authenticity and/or integrity of the user data stored in the namespace. In one example, the metadata is 8 bytes of data, and the namespace is reformatted to have a sector size of 4K+8 bytes per sector. In one example, a customer that purchases an SSD will reformat a namespace to have a larger sector size so metadata can be added to user data stored in each block of the namespace.

The reformatting above does not change the sector size of the MBR data that is assigned to the namespace. Thus, the sector size of the MBR data (e.g., 4K bytes) and the sector size of the reformatted namespace (e.g., 4K+8 bytes) no longer match. In other words, the sector sizes are different after this reformatting.

The above mismatch in sector sizes between the reformatted namespace and the originally-written MBR data creates a technical problem that arises when a host attempts to read the reformatted namespace. In particular, during booting for example, the host sends one or more read commands to a controller of an SSD for reading one or more addresses within an address range of the namespace corresponding to the MBR region. In one example, the first 128 or 256 MB of the namespace correspond to the MBR region, and because the master boot record is enabled for the namespace, the controller handles the read command as a request to read MBR data.

In one example, the controller compares addresses for incoming read commands from a host to a defined MBR address range (for an MBR-enabled namespace) to identify those read commands that may require address translation of an incoming address associated with the read command to a corresponding address in the MBR region. In one example, the address translation is handled by the controller as a hardware exception to be handled by firmware of the controller. In some cases, the MBR data in the MBR region is referred to as a "shadow MBR".

In some cases, the host requires that data be returned from the SSD in the same format as the namespace being addressed by the read command. However, as mentioned above, the MBR data has a different sector size than the reformatted namespace. Thus, the controller is not able to meet this requirement. For example, this requirement to return read data in the same format as the format for the namespace from which the data is read is required by the Trusted Computing Group (TCG) Opal Storage Specification.

In another example of the technical problem above, an SSD has a master boot record written using a secure command into sector sizes of 512 or 4K bytes. The SSD is formatted so the corresponding MBR-enabled namespace has sector sizes of 512 or 4K bytes. For example, a secure send/receive command protocol is used to write the MBR data (e.g., data such as keys, passwords, etc.).

In one example, after the SSD is received by a customer, the customer puts its own passwords, etc., on the SSD. The customer does authentication of the SSD (e.g., opens a TCG session), which allows the customer to write MBR data to the MBR region of the SSD. The customer uses a secure send/receive command to write to the MBR address range (e.g., first 256 MB of the MBR-enabled namespace) (e.g., keys, passwords, etc., are written to the MBR data). Then, the TCG session is closed.

When the MBR data is later read for a host during booting, instead of using a secure send/receive command, the MBR data is handled as regular I/O read (e.g., like a read to user data of the namespace). As long as the namespace is in the original format, the MBR data can be read normally (e.g., using a regular I/O read command to a first number of LBAs of the namespace). In one example, when the MBR is enabled, a read to a user LBA within the MBR range gets translated (e.g., remapped) to a location in memory from which the MBR data is actually read.

As mentioned above, in some cases, metadata is added to user data stored on the SSD. The metadata can have an arbitrary size (e.g., 8, 16, or 32 bytes of additional data that a customer can store for each LBA). For example, a customer may desire to keep track of internal data (e.g., a seed number, or a signature) for each LBA. This additional information is added to each sector and then written to the storage media (e.g., the MBR-enabled namespace). Thus, the namespace is reformatted to have a larger sector size to accommodate this metadata. For example, an SSD namespace can have a million LBAs formatted at 4K bytes per sector, and then be reformatted to 4K+32 bytes per sector.

After reformatting, the namespace must be read at a larger size format (e.g., 4K+8 bytes). But for reading MBR data, the additional bytes (e.g., 8 bytes) are not available to the controller because the MBR data was only written in the original format (e.g., 4K byte sector size). The TCG Opal Specification requires (and host device expects) that the MBR data will be returned in the current format of the namespace being read. Thus, this presents the technical problem of sector size mismatch as discussed above.

The sector size mismatch can also occur if a namespace is reformatted to have a smaller sector size. For example, the format size could be made smaller by reformatting from 4K to 512+8 bytes. So, there is still a missing data problem for reads of the MBR data.

At least some aspects of the present disclosure address the above and other technical problems by adding padding (e.g., 8 bytes of padding) to the MBR data as it is read from the MBR region. Thus, the format of the padded MBR data (e.g., 4K+8 bytes) provided to the host in reply to a read command to the MBR region is the same as the format of the namespace (e.g., 4K+8 bytes) for which the master boot record is enabled. In one example, this enables complying with the formatting requirements of the Trusted Computing Group (TCG) Opal Storage Specification for data read from a namespace (e.g., the MBR data read from a master boot record for a read to an address in an MBR address range of the namespace).

In one embodiment, the padding is a fixed pattern of zeros and ones. In one embodiment, the controller can dynamically select the pattern of zeros and ones based on a determined context of a read.

In one embodiment, a storage device has memory providing a storage capacity for storing data for a host. A portion of the storage capacity is allocated to a namespace. The storage device has a controller configured to: format the namespace using a first sector size (e.g., 4K bytes); write master boot record (MBR) data to an MBR region of the memory that is outside of the namespace, wherein the MBR region is formatted using the first sector size (e.g., 4K bytes); after writing the MBR data, format the namespace using a second sector size (e.g., 4K+8 bytes); after formatting the namespace using the second sector size, receive a read command from a host device, wherein the read command is for an address in the namespace (e.g., LBAs 0-2 of FIG. 3) that is within an address range that corresponds to the MBR region; in response to receiving the read command, read the MBR data; add padding to the read MBR data to provide padded MBR data, wherein a size of the padding is equal to a difference between the first and second sector sizes (e.g., 8 bytes); and send the padded MBR data to the host device.

In one embodiment, an SSD adds padding to MBR data for an I/O read. The original MBR data is padded to match the new reformatted namespace sector size. A pattern for the padding is generated in real-time (e.g., a pattern of all zeros) during the read.

For example, original MBR data is 4096 bytes for a first LBA, then the same for all subsequent LBAs in a master boot record. Then, the namespace is reformatted to 4096+8 bytes per sector. Now, the controller needs to return 4096 bytes of MBR data+8 bytes of padding. As MBR data for each LBA is read, padding is added.

In another example, original MBR data is in 4K bytes (8×512 bytes) sector size, then a namespace is reformatted to 512+8 bytes sector size. The controller adds padding 8 times for each 4K sector when reading the MBR data.

In one example, the original 4K of MBR data is read into a temporary buffer. Then, the controller transcribes original MBR data to add an 8 byte pad to each of eight 512 byte chunks from the original 4K MBR data. The transcribed data is put into the temporary buffer. Then, each padded chunk (520K bytes) is sent to the host from the temporary buffer.

FIG. 1 shows a computer system having a storage device in which embodiments disclosed herein can be implemented. In FIG. 1, a host (101) communicates with a storage device (103) via a communication channel having a predetermined protocol. The host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication portion, and/or a computer network.

The computer storage device (103) can be used to store data for the host (101). Examples of computer storage devices in general include hard disk drives (HDDs), solid-state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a mobile network link); and the host (101) and the storage device (103) can be configured to communicate with each other using data storage management and usage commands similar to those in NVMe protocol.

The storage device (103) has a controller (107) that runs firmware (104) to perform operations responsive to the communications from the host (101). Firmware in general is a type of computer program that provides control, monitoring and data manipulation of engineered computing devices. In FIG. 1, the firmware (104) controls the operations of the controller (107) in operating the storage device (103), such as the allocation of namespaces for storing and accessing data in the storage device (103).

The storage device (103) has non-volatile storage media (109), such as magnetic material coated on rigid disks, and memory cells in an integrated circuit. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D cross-point memory, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random- Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D cross-point memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or instructions organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

Storage device (103) includes buffer (111) (e.g., DRAM). In one embodiment, buffer (111) is used as a temporary buffer to hold read MBR data. Padding is added to the read MBR data in the temporary buffer, as described herein.

For example, the firmware (104) can be configured to use the techniques discussed below for adding padding to MBR data. However, the techniques discussed below are not limited to being used in the computer system of FIG. 1 and/or the examples discussed above.

Figure 2:
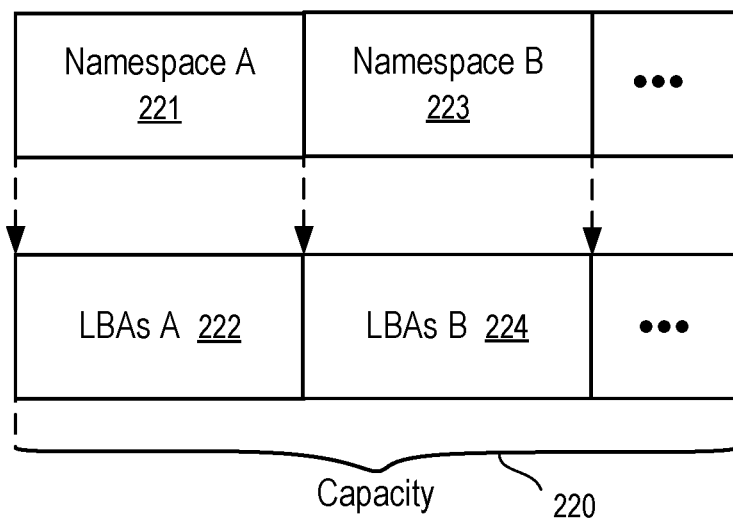
FIG. 2 shows an example of a storage capacity of a memory allocated to multiple namespaces, each formatted using logical block addressing.

FIG. 2 shows an example of a storage capacity of a memory (e.g., an SSD using NAND flash) allocated to multiple namespaces, each formatted using logical block addressing. For example, the namespaces can be implemented in the storage device (103) illustrated in FIG. 1.

The non-volatile storage media (109) of the storage device (103) has memory units (e.g., blocks) that may be identified by a range of LBAs (222, 224, . . . ), where the range corresponds to a memory capacity (220) of the non-volatile storage media (109).

In FIG. 2, namespaces (221, 223) are allocated directly from the available region of the capacity (220). In one example, when one of the allocated namespaces (221, 223) is deleted, the remaining portion of capacity (220) is free for allocation to another namespace.

Figure 3:
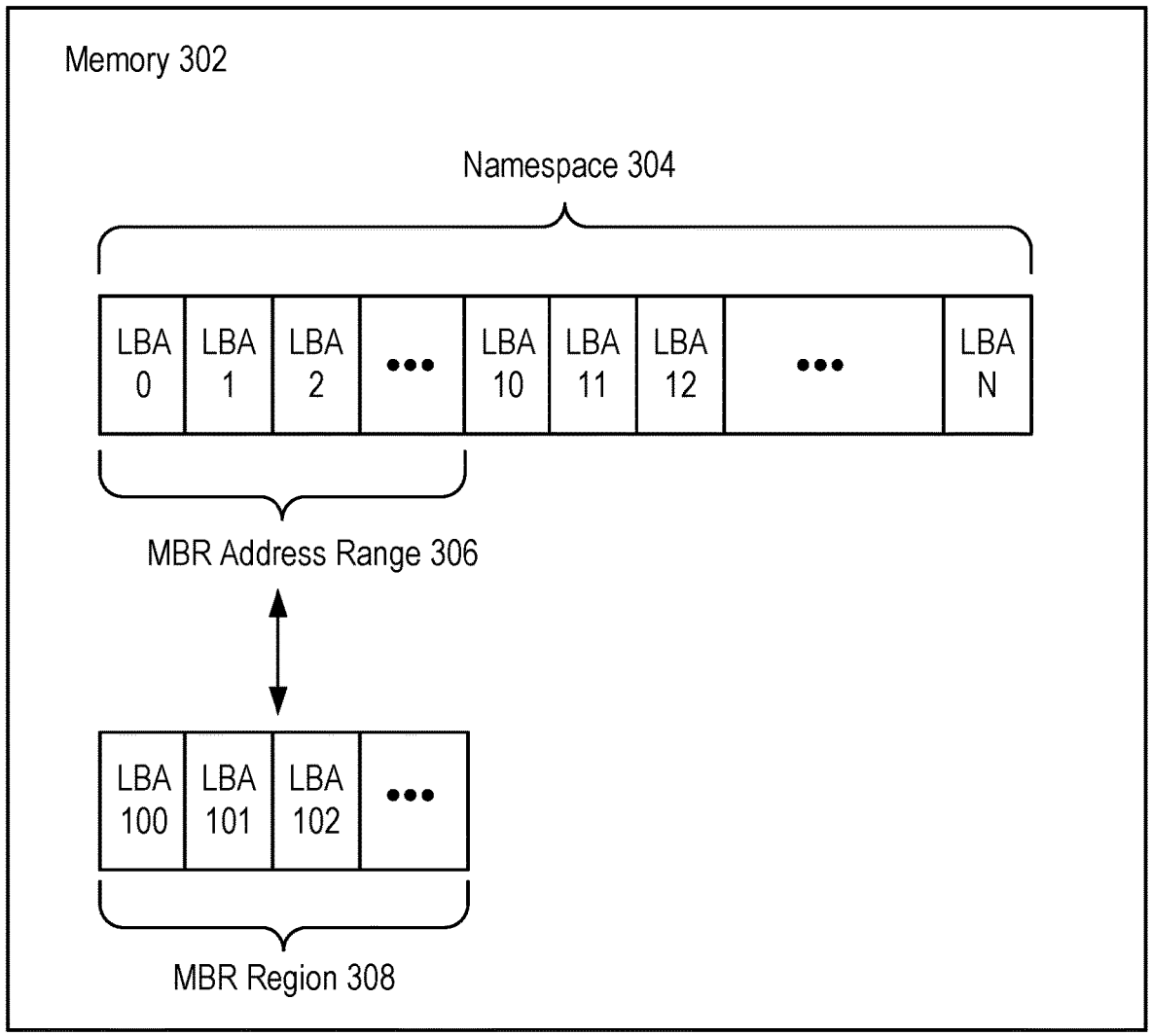
FIG. 3 shows a memory having a namespace for storing user data, and a master boot record (MBR) region for storing a master boot record, in accordance with some embodiments.

FIG. 3 shows a memory (302) having a namespace (304) for storing user data, and a master boot record (MBR) region (308) for storing a master boot record, in accordance with some embodiments. In one example, memory (302) is implemented using non-volatile storage media (109). Namespace (304) is an example of namespace (221, 223). MBR region (308) is located outside of namespace (304) at another location in memory (302).

Namespace (304) is formatted using logical block addressing to have LBAs (0-N). An MBR address range (306) (e.g., LBAs (0, 1, 2, . . . )) of namespace (304) corresponds to MBR region (308). MBR region (308) is formatted using logical block addressing to have LBAs (100, 101, 102, etc.). User data is stored in the addresses of namespace (304) that are outside of MBR address range (306) (LBAs (10-N)).

In one example, if a master boot record stored in MBR region (308) is enabled on namespace (304), read operations in response to a read command from a host device to namespace (304) for an address falling within MBR address range (306) are translated to an address in MBR region (308). For example, a read to LBA (0) of namespace (304) is translated to read data stored at LBA (100) of MBR region (308). MBR data stored in MBR region (308) is read and returned to the host device.

In contrast to the above, if no master boot record is enabled on namespace (304), read operations in response to a read command from a host device to namespace (304) for an address falling within MBR address range (306) will simply return user data that is stored at LBAs (0, 1, 2, etc.). In other words, there is no address translation and no MBR data is read for or returned to the host.

In one example, a portion of a total storage capacity for an SSD is allocated to namespace (304). Other portions of the storage capacity can be allocated to other namespaces (not shown). Namespace (304) is MBR-enabled and formatted into several LBAs (0-N), and each LBA is formatted to have a sector size 106 of 4K bytes.

Data stored in namespace (304) includes user data used by a host device for various operations. MBR data corresponds to LBAs (0, 1, 2, . . . ), and the user data is stored at LBAs (10-N). During manufacturing, the MBR data is written to LBAs (100, 101, 102, etc.) using a secure send/receive command. The MBR data is written for use by the host device when booting up the SSD after manufacturing and/or later during use by an end-user of the SSD.

Namespace (304) is reformatted after manufacturing so that metadata can be added to one or more sectors of namespace (304). In one example, a user or customer of the manufactured product requests that the metadata be added. Thus, namespace (304) is reformatted to accommodate this request.

In one example, namespace (304) is reformatted to a sector size of 4K+8 bytes so that 8 bytes of metadata can be stored in each sector (each LBA block). During the reformatting of namespace (304), the original MBR data written to LBAs (100, 101, 102, etc.), is not changed.

In one example, user data stored in namespace (304) is erased during reformatting, but is then written back to LBAs (10-N) along with metadata corresponding to each LBA. Alternatively, the user data is replaced by different user data along with metadata or without metadata.

When MBR data is read from LBAs (100, 101, 102, etc.), the controller reads the MBR data using a regular I/O read. The host device expects that the read data will be provided in the new sector size 4K+8 bytes, so the controller adds padding (e.g., 8 metadata bytes) to each sector of 4K bytes of MBR data. The padding is added during the read operation. The size of the padding is the difference in sector size between reformatted namespace (304) and MBR region (308). In one example, the padding is added to MBR data in a temporary buffer (e.g., using buffer 111 of FIG. 1), prior to sending to the host device.

Figure 4:
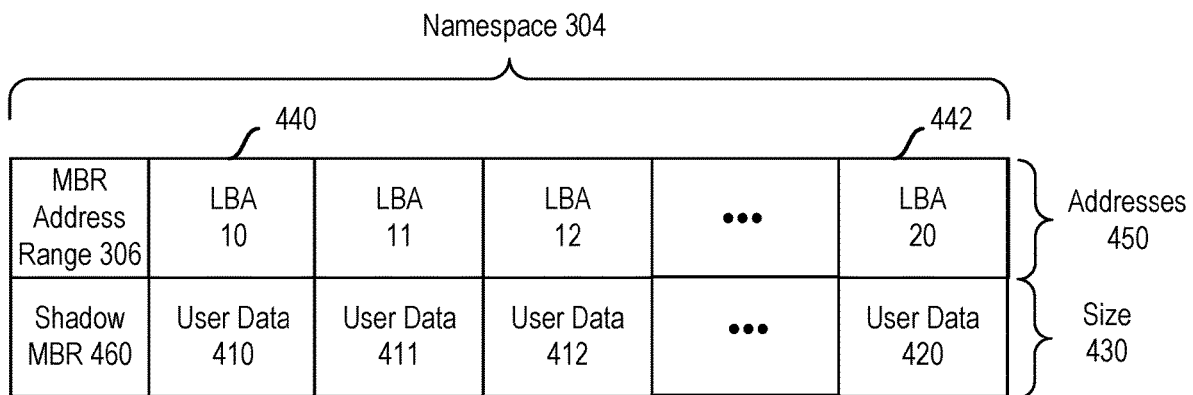
FIG. 4 shows the namespace of FIG. 3 in an initial format having a first sector size, in accordance with some embodiments.

FIG. 4 shows namespace (304) in an initial format (e.g., formatting at time of manufacturing) having a first sector size (430) (e.g., 512 or 4K bytes per sector), in accordance with some embodiments. Namespace (304) is formatted into blocks (440, 442) each addressed using a logical block addresses (450) (LBAs). User data (410, 411, . . . , 420) is stored at LBAs (10-20).

MBR address range (306) corresponds to addresses in MBR region (308). Shadow master boot record (MBR) (460) is stored in MBR region (308). Shadow MBR (460) is enabled by a controller (e.g., controller (107)) for namespace (304). Shadow MBR (460) is formatted with a sector size that is the same as sector size (430) of namespace (304). Shadow MBR (460) is read when a read command within MBR address range (306) is received by the controller from a host device.

Figure 5:
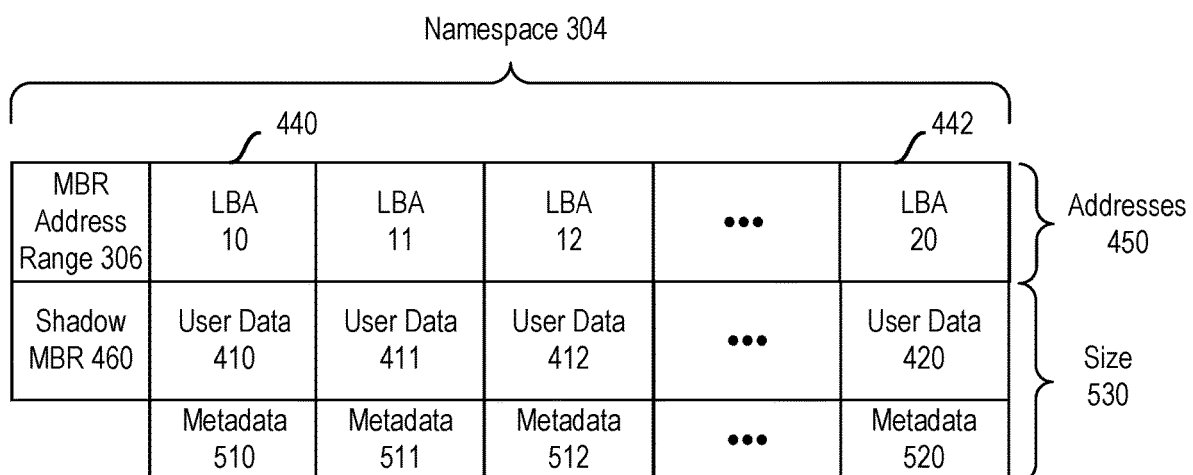
FIG. 5 shows the namespace of FIG. 4 after reformatting to have a second sector size, in accordance with some embodiments.

FIG. 5 shows namespace (304) of FIG. 4 after reformatting to have a second sector size (530) (e.g., 512+8 bytes per sector; or e.g., 4K+8, 4K+16, or 4K+32 bytes per sector), in accordance with some embodiments. The increase in sector size corresponds to a size in bytes of metadata (510, 511, . . . , 520) that is added to each of blocks (440, 442) of namespace (304), as discussed above. The format and content of shadow MBR (460) is not changed during this reformatting, as discussed above. The reformatting creates a sector size mismatch between sector size (430) of shadow MBR (460) and sector size (530) of reformatted namespace (304).

Figure 6:
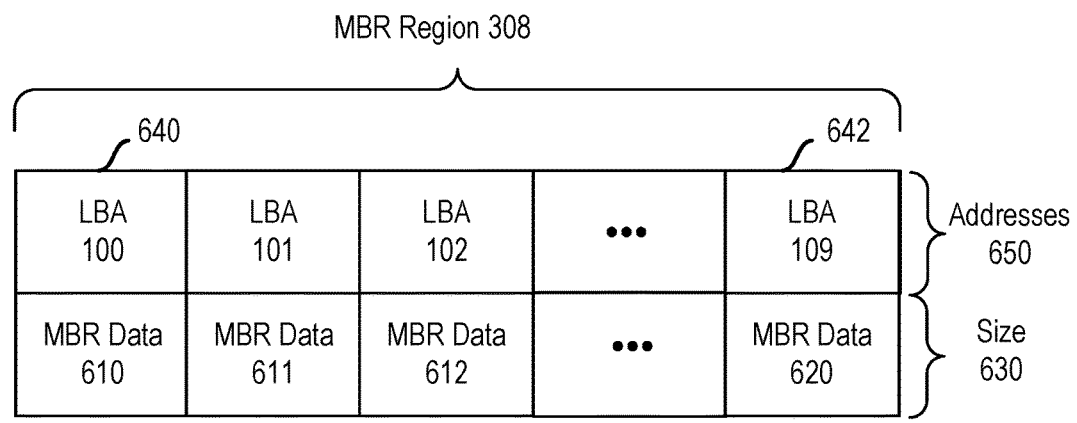
FIG. 6 shows formatting for a master boot record (MBR) region of a memory, in accordance with some embodiments.

FIG. 6 shows formatting for master boot record (MBR) region (308) of memory (302), in accordance with some embodiments. MBR region (308) is formatted as blocks (640, 642) at logical block addresses (650) (e.g., LBAs (100, 101, . . . , 109)). Each block stores MBR data (610, 611, . . . , 620). The MBR data corresponds to shadow MBR (460).

Each block has a sector size (630) (e.g., 4K bytes per sector). The sector size (630) is the same as sector size (430) for the initial formatting of namespace (304).

Figure 7:
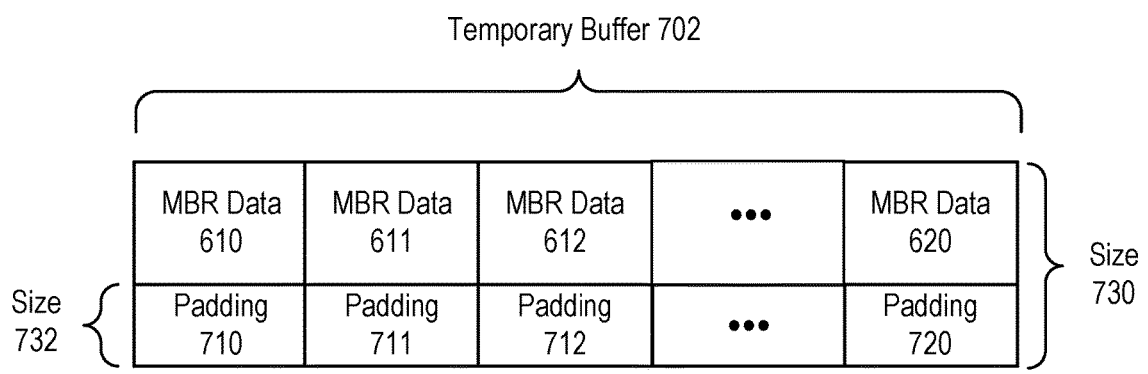
FIG. 7 shows the addition of padding to MBR data read from the MBR region of FIG. 6, in accordance with some embodiments.

FIG. 7 shows the addition in a temporary buffer (702) of padding (710, 711, . . . , 720) to MBR data (610, 611, . . . , 620) read from MBR region (308) of FIG. 6, in accordance with some embodiments. The padding has a size (732) (e.g., 8 bytes per MBR data sector), and the padding is added to each sector of the MBR data read from MBR region (308). The size (732) is equal to the difference between sector size (630) of the MBR data and sector size (530) of reformatted namespace (304). In one example, temporary buffer (702) is implemented using buffer (111) of FIG. 1.

In one embodiment, as each sector of MBR data is read into temporary buffer (702), padding is added. The padded MBR data has a size (730), which is the same as sector size (530) of reformatted namespace (304). Thus, this provides a technical solution to the problem of sector size mismatch discussed above.

Figure 8:
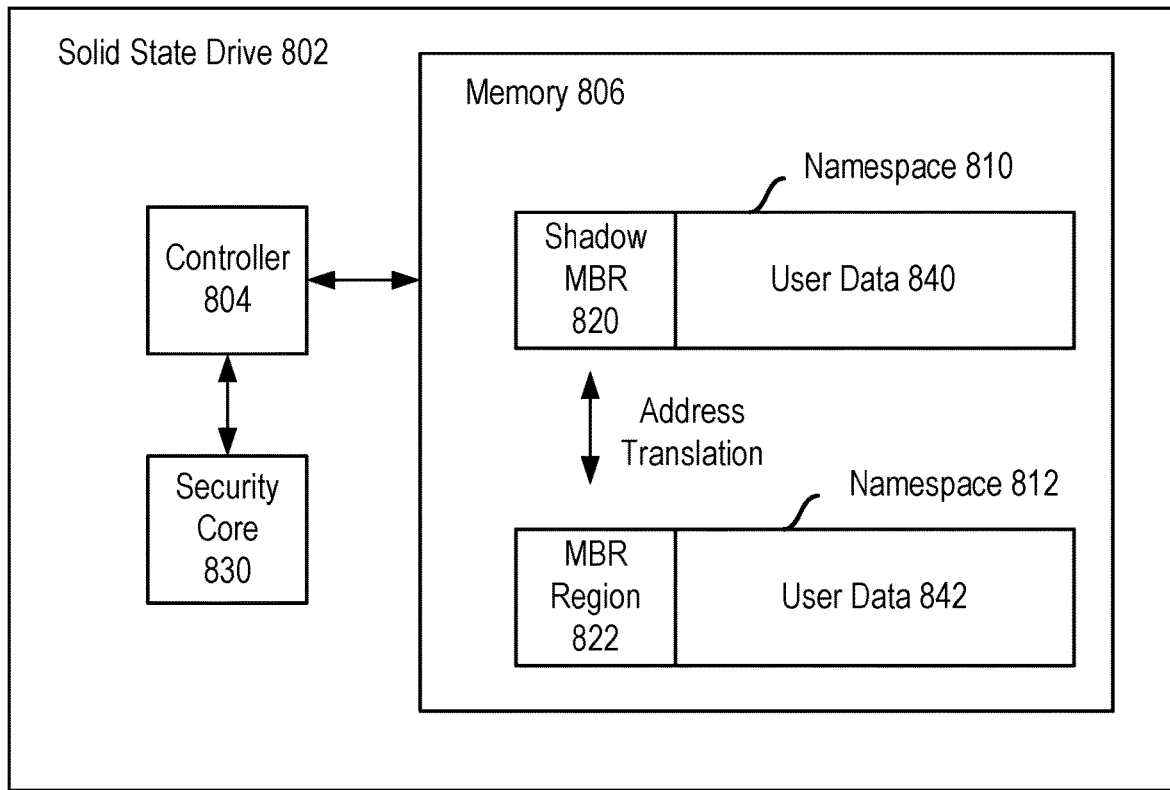
FIG. 8 shows a solid-state drive (SSD) having a master boot record that is enabled for a namespace in accordance with some embodiments.

FIG. 8 shows a solid-state drive (SSD) (802) having a shadow master boot record (820) that is enabled for a namespace (810) in accordance with some embodiments. Namespace (810) stores user data (840) used by a host device (not shown). Memory (806) may include multiple namespaces. For example, namespace (812) is another namespace of memory (806) that stores user data (842) for the host device (or for a different host device).

The MBR data for shadow MBR (820) is stored in MBR region (822) of namespace (812). Controller (804) receives read and write commands from the host device that desires access to memory (806). Any access to memory (806) by the host device must be approved by a security core (830). In one example, security core (830) is a security system as described in the Trusted Computing Group (TCG) Opal Storage Specification. In one example, security core (830) is in one package, and controller (804) and/or memory (806) are in a different package (e.g., located different chips or die). A read by the host device to an address in a range that corresponds to shadow MBR (820) is translated to an address in MBR region (822), for example as described above.

SSD (802) is an example of storage device (103). Memory (806) is an example of memory (302). Controller (804) is an example of controller (107). MBR region (822) is an example of MBR region (308).

In one embodiment, for any command (e.g., a read command) received from the host device, controller (804) sends a request to security core (830). The request includes a namespace (e.g., namespace (810)) corresponding to the command and an address (e.g., a range of LBAs) corresponding to the command. In response to the request, security core (830) provides an indication of an action to be taken in response to receiving the command. In one embodiment, the address corresponding to the command is in a logical block address (LBA) range (e.g., MBR address range (306)) associated with the shadow MBR (820), and the action is returning MBR data read from MBR region (822) to the host device.

In one embodiment, authentication of the host device by security core (830) is required prior to security core (830) approving access to any MBR data by the host device.

In one example, because shadow MBR (820) is enabled for namespace (810), controller (804) dedicates a range of LBAs to storing MBR data. Any read requests by the host device to that dedicated range of LBAs is translated as a request to read the MBR data. For example, a read to LBA (0) is translated to read LBA (100) as described for FIG. 3. Security core (830) must approve access to the MBR data by the host device.

In one example, if an address for a command from the host device falls within the MBR address range of a namespace, a hardware exception is generated and firmware of controller (804) sends a request to security core (830). The request identifies the namespace and LBA range corresponding to the received host command (e.g., read command). Security core (830) responds with action to be taken (e.g., return MBR data to the host device).

In one embodiment, in order to access MBR data, including writing the MBR data to MBR region (822), the host device must authenticate itself to security core (830) (e.g., a TCG security chip). To access user data (840) at later time after the MBR data is written, after a boot-up (e.g., after SSD (802) has been powered down) the host device must again authenticate itself.

In one embodiment, I/O reads to any namespace in memory (806) are handled as a regular read of user data unless an MBR is enabled for the namespace, in which case a hardware exception is triggered and handled by controller (804) (e.g., using firmware (104)).

In one example, a host device makes a request to read the first 256 MB of namespace (810). Controller (804) identifies this as corresponding to the MBR, so an exception is triggered in which controller (804) interrupts the read and handles the read as an exception, including redirecting the read to where the actual MBR data is written in MBR region (822). For example, a read to LBA (0) is translated to read MBR data at an address in MBR region (822) determined by adding an address offset to LBA (0).

Figure 9:
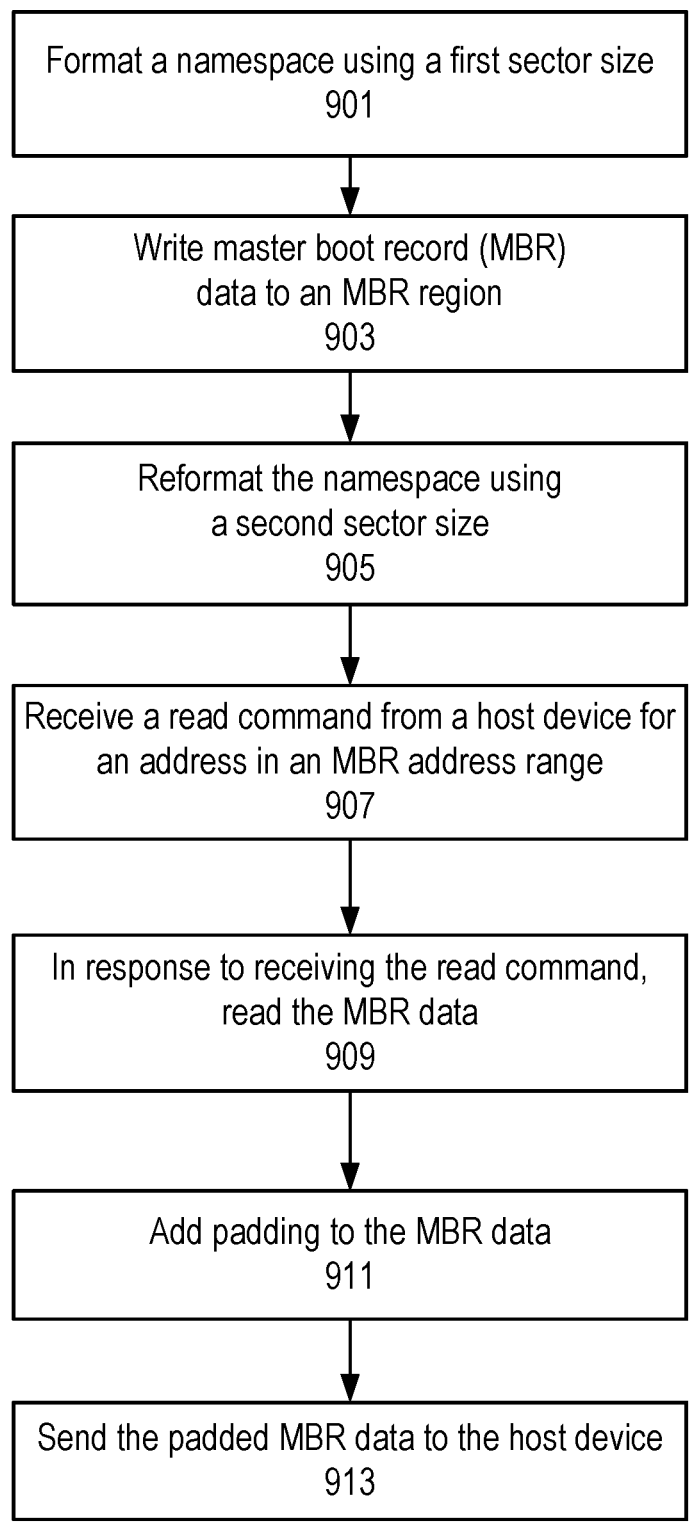
FIG. 9 shows a method for reading a master boot record for a namespace after reformatting the namespace, in accordance with some embodiments.

FIG. 9 shows a method for reading a master boot record for a namespace after reformatting the namespace, in accordance with some embodiments. For example, the method of FIG. 9 can be implemented in the system of FIG. 1. In one example, the reformatted namespace is namespace (304) of FIG. 5.

The method of FIG. 9 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 9 is performed at least in part by one or more processing devices (e.g., controller (107) of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block (901), a namespace is formatted using a first sector size. In one example, the namespace is namespace (304, 810). In one example, the first sector size is size (430).

At block (903), MBR data is written to an MBR region. In one example, the MBR region is MBR region (308, 822).

At block (905), the namespace is reformatted using a second sector size. In one example, the second sector size is size (530).

At block (907), a read command is received from a host device for an address in an MBR address range. In one example, the host device is host (101). In one example, the address is an LBA in MBR address range (306).

At block (909), in response to receiving the read command, the MBR data is read. In one example, the MBR data is data for a master boot record enabled on namespace (304). In one example the MBR data is MBR data (610, 611, . . . , 620).

At block (911), padding is added to the MBR data. In one example, the padding is padding (710, 711, . . . , 720).

At block (913), the padded MBR data is sent to the host device. In one example, the padded MBR data is sent from temporary buffer (702).

In one embodiment, a system comprises: memory (e.g., 302) configured to provide a storage capacity for storing data, wherein at least a portion of the storage capacity is allocated to a namespace (e.g., 304); and a controller (e.g., 107) configured to: format the namespace using a first sector size (e.g., 4K bytes); write master boot record (MBR) data to an MBR region (e.g., 308) of the memory that is outside of the namespace, wherein the MBR region is formatted using the first sector size (e.g., 4K bytes); after writing the MBR data, format the namespace using a second sector size (e.g., 4K+8 bytes); after formatting the namespace using the second sector size, receive a read command from a host device, wherein the read command is for an address in the namespace (e.g., LBAs (0-2)) that is within an address range (e.g., MBR address range (306)) that corresponds to the MBR region; in response to receiving the read command, read the MBR data; add padding (e.g., 710-720) to the read MBR data to provide padded MBR data, wherein a size of the padding is equal to a difference between the first and second sector sizes (e.g., 8 bytes); and send the padded MBR data to the host device.

In one embodiment, after formatting the namespace using the second sector size, the host device requires that any block of data read from the namespace have a size equal to the second sector size.

In one embodiment, the controller is further configured to, in response to receiving any read command in an address range that corresponds to the MBR region, make a security request for approval to access the MBR region.

In one embodiment, the memory is configured in a first package, the system further comprising a security core (e.g., 830) configured in a second package. The security request is sent to the security core.

In one embodiment, the memory and controller are configured in a solid-state drive, and the address in the namespace is a logical block address (LBA).

In one embodiment, the controller is further configured to, in response to receiving the read command, translate the address in the namespace to an address in the MBR region. The MBR data is read from the MBR region.

In one embodiment, the memory is configured in a solid-state drive (SSD) (e.g., 802), the MBR data is stored in a master boot record that is read by the SSD when booting up, and the controller is further configured to determine whether the master boot record is enabled for the namespace. The address in the namespace is translated in response to determining that the master boot record is enabled for the namespace.

In one embodiment, the namespace is formatted using logical block addresses (LBAs) into a plurality of blocks configured to store user data. In one example, the user data is user data (410, 411, . . . , 420).

In one embodiment, each of the blocks further stores respective metadata (e.g., 510-520) having a size (e.g., 8 bytes) equal to the size of the padding.

In one embodiment, the respective metadata comprises a characteristic associated with user data stored in the same block.

In one embodiment, the respective metadata is a signature of the user data stored in the block.

In one embodiment, the MBR data is written to the MBR region in response to receiving a secure command (e.g., secure send/receive command) from the host device.

In one embodiment, the system further comprises a temporary buffer (e.g., 702), wherein the controller is further configured to, prior to sending the padded MBR data to the host device: store the MBR data in the temporary buffer after reading the MBR data from the MBR region; and add the padding to the MBR data stored in the temporary buffer.

In one embodiment, the address range that corresponds to the MBR region is a first 128 MB or 256 MB of the namespace.

In one embodiment, the padding is a string of ones and zeros in a fixed pattern.

In one embodiment, the MBR region comprises a plurality of sectors, and each sector has the first sector size; and adding padding to the MBR data comprises adding respective padding to each sector of the MBR data that is read from the MBR region.

In one embodiment, a system comprises: at least one memory allocated to at least one namespace, wherein a first namespace (e.g., 810) of the memory is formatted to have a first sector size (e.g., 4K bytes); and a controller configured to: store master boot record (MBR) data (e.g., MBR data (610-620)) in a master boot record that is assigned to the first namespace, wherein a format of the master boot record is the first sector size (e.g., 4K bytes); format the first namespace to have a second sector size (e.g., 4K+8 bytes); receive a first read command from a host device, wherein the first read command is for an address in the first namespace (e.g., LBAs (0-2)) that is within an address range that corresponds to the master boot record; in response to receiving the first read command, read a plurality of sectors of the MBR data; add padding to each read sector of the MBR data to provide padded MBR data, wherein a size of the padding added to each sector is equal to a difference between the first and second sector sizes (e.g., 8 bytes); and send the padded MBR data to the host device.

In one embodiment, a second namespace (e.g., 812) is formatted to have the first sector size (e.g., 4K bytes), and the master boot record is stored in the second namespace.

In one embodiment, the controller is further configured to determine whether the master boot record is enabled for the first namespace. Reading the sectors of the MBR data is further in response to determining that the master boot record is enabled for the first namespace.

In one embodiment, the controller is further configured to: receive a second read command from the host device, wherein the second read command is for an address in the first namespace (e.g., LBAs (0-2)) that is within the address range that corresponds to the master boot record; determine that the master boot record is not enabled for the first namespace; in response determining that the master boot record is not enabled, read data (e.g., user data) from the first namespace; and send the read data to the host device.

In one embodiment, each sector of the MBR data is a block having a logical block address (LBA).

In one embodiment, the memory is configured in a solid-state drive (SSD), and the host device requires that data read from any namespace of the SSD be provided to the host device in a format having the same sector size as the namespace from which the data is read.

In one embodiment, the data read from the namespace of the SSD includes at least one of user data stored in the namespace of the SSD, or MBR data stored in a master boot record assigned to the namespace of the SSD.

In one embodiment, the controller is further configured to: for any command received from the host device, send a request to a security core, the request including a namespace corresponding to the command and an address corresponding to the command; and receive, from the security core, an indication of an action to be taken in response to receiving the command.

In one embodiment, the address corresponding to the command is in a logical block address (LBA) range associated with the master boot record, and the action is returning MBR data to the host device.

In one embodiment, authentication of the host device by the security core is required prior to the security core approving access to any MBR data.

In one embodiment, a method comprises: formatting a namespace using a first sector size (e.g., 4K bytes); writing master boot record (MBR) data to an MBR region outside of the namespace, wherein the MBR region is formatted using the first sector size (e.g., 4K bytes); after writing the MBR data, formatting the namespace using a second sector size (e.g., 4K+8 bytes); receiving a read command from a host device, wherein the read command is for an address in the namespace (e.g., LBAs (0-2)) that is within an address range that corresponds to the MBR region; in response to receiving the read command from the host device, reading the MBR data; adding padding to the read MBR data to provide padded MBR data, wherein a size of the padding is equal to a difference between the first and second sector sizes (e.g., 8 bytes); and sending the padded MBR data to the host device.

Various embodiments related to reading a master boot record (MBR) for a namespace in a storage device using a regular read operation are now described below. The generality of the following description is not limited by the various embodiments described above.

For purposes of illustration, some exemplary embodiments are described below in the context of a flash memory device (e.g., NAND flash). In one example, MBR data is read from a master boot record assigned to a namespace of the flash memory device.

However, the methods and systems of the present disclosure are not limited to use in flash memory devices. Instead, other embodiments may relate to other types of systems. For example, such other systems may include a storage device using cross-point memory (e.g., memory using chalcogenide memory cells). The storage device may, for example, store data used by a host device (e.g., a computing device of an autonomous vehicle, or another computing device that accesses data stored in the memory device). In one example, the storage device is a solid-state drive mounted in an electric or other vehicle (e.g., car, drone, ship, etc.).

As mentioned above, after creating a new namespace in memory, a master boot record can be assigned to the namespace (e.g., the MBR is enabled for the namespace as described for the Trusted Computing Group (TCG) Opal Storage Specification). Master boot record (MBR) data is written to an MBR region of the memory that is used for storing the master boot record. In one example, the MBR region can be located in a portion of the memory outside of the new namespace (e.g., the controller assigns or maps a range of blocks addressed using LBAs as the MBR region). In another example, the MBR region can be located in a portion of the namespace that is not used to store user data.

As described above, in some cases the sector size of a namespace is increased by reformatting so that metadata can be stored along with user data in each sector (e.g., LBA block) of the namespace. As discussed above, this causes a technical problem in which MBR data has a different sector size than the reformatted namespace. A technical solution was described above in which padding is added to the MBR data as it is read. The use of the padding resulted in the format of the padded MBR data (e.g., 4K+8 bytes) provided to the host in reply to a read command to the MBR region being the same as the format of the namespace (e.g., 4K+8 bytes).

However, reading of MBR data to be padded uses one or more hardware exceptions handled by firmware of a controller for doing address translation to the MBR data, such as discussed above. For example, a hardware exception is triggered that causes firmware to do non-user address translation to the MBR data. In one example, an interface used to read the MBR data assigned to the reformatted namespace is much slower than a read path used to access user data from the same namespace. In one example, this interface is a translation address service used for non-user data. The use of such hardware exceptions causes the technical problem of reducing the speed at which MBR data is read because the read interface is significantly slower than the read path for regular read operations (e.g., for reading user data). In one example, this increases the boot time required to start a storage device.

Various embodiments described below address the above and other technical problems by reading MBR data using a regular read operation in which no hardware exception is required. In one example, this results in reads of MBR data used by a host device (e.g., to boot up) to have comparable speeds (e.g., similar read latencies) as achieved for reads of user data stored for use by the host device in executing various applications and/or other software after booting.

In one embodiment, a host device sends read commands to a storage device to read data in a namespace (e.g., namespace 1). The storage device returns either MBR data or user data to the host device in response to the read commands. The storage device uses read circuitry (e.g., decoders, sense amplifiers, etc.) to read either of the user data or the MBR data depending on an address of a given read command (e.g., LBA range) (e.g., host address sent with the read command).

For example, if the address for a read command falls within an address range that corresponds to a master boot record for the namespace, the MBR data is read by the read circuitry. If the address for a read command falls within an address range that corresponds to user data stored in the namespace, then the user data is read by the same read circuitry. The read latency in either case is substantially the same because no hardware exception is triggered.

In an alternative embodiment, a master boot record is enabled for the namespace above (e.g., namespace 1) so that read commands for addresses in an MBR address range of the namespace are handled by a hardware exception in firmware of a controller. This is a slow path (speed is slower). In contrast, read commands for addresses in a user data range of the namespace are handled using the same read circuitry above. This is a fast path (speed is faster).

In one embodiment, in contrast to the alternative embodiment above, the master boot record for the namespace above (e.g., namespace 1) is disabled. As a result, reads of the MBR data are handled by the read circuitry above (e.g., using the fast path).

In one embodiment, the master boot record can be selectively enabled or disabled for the namespace as desired during the lifetime of a storage device. In one example, the master boot record is enabled only when metadata (e.g., metadata 510-520 of FIG. 5) is to be added to each sector in the namespace (e.g., after reformatting). If metadata is later not needed, then the master boot record can be disabled so that reads of MBR data use the fast path of the read circuitry above. The namespace can also be reformatted since metadata is no longer desired. The new format can match a format of the MBR data.

In one embodiment, a storage device has memory allocated to one or more namespaces. The memory stores user data in a first namespace, and further stores master boot record (MBR) data in an MBR region assigned to the first namespace. Read circuitry of the storage device is configured to, in response to read commands received from a host device for addresses in the first namespace, read either of the user data or the MBR data.

A controller of the storage device is configured to, in response to a secure command received from the host device, write the MBR data to the MBR region. After the MBR data has been securely written, the controller is further configured to receive a first read command from the host device. The first read command is for a first address in the first namespace that is within an address range that corresponds to the MBR region. In response to receiving the first read command, the controller reads the MBR data using the read circuitry, and sends the read MBR data to the host device. The read circuitry is configured to read either of the user data or the MBR data using a regular input/output (I/O) hardware path as part of read operations performed in response to the read commands from the host device.

Figure 10:
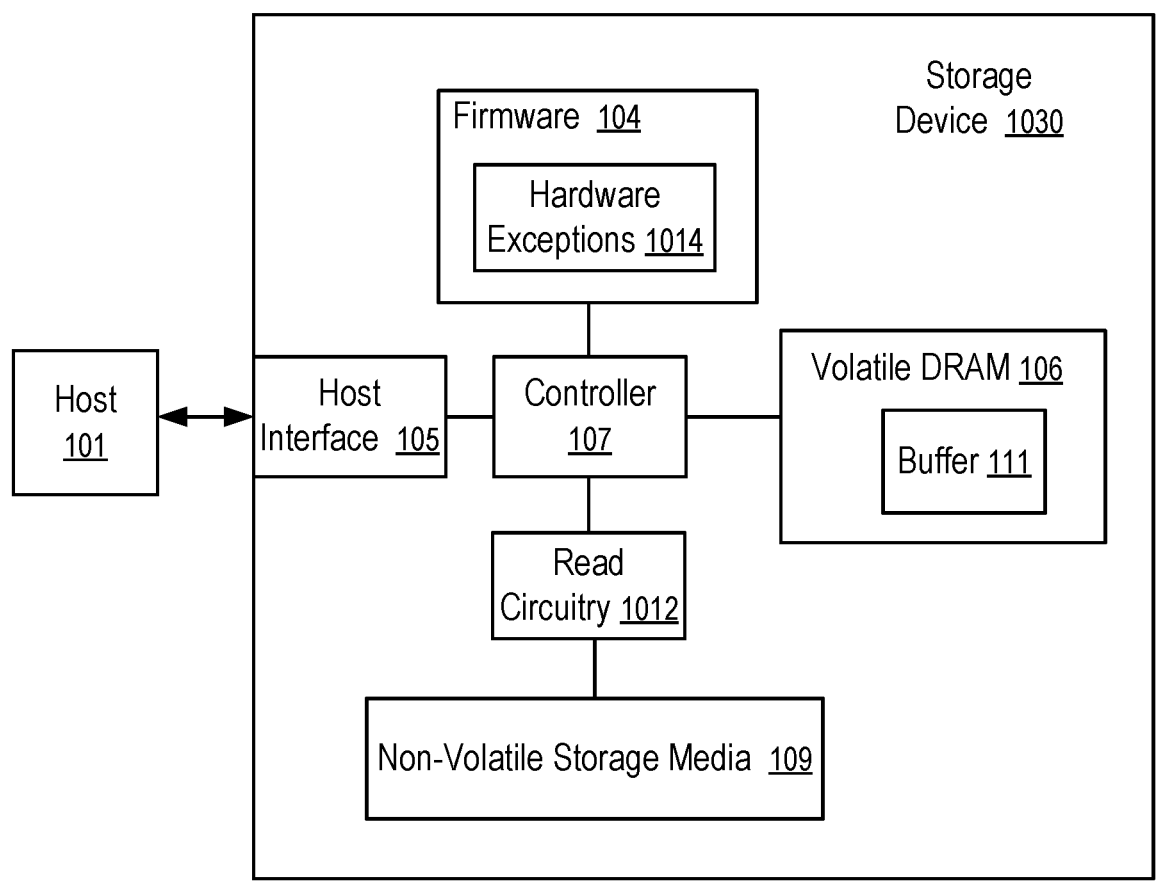
FIG. 10 shows a computer system having a storage device including read circuitry to read MBR data using regular read operations, in accordance with some embodiments.

FIG. 10 shows a computer system having a storage device (1030) including read circuitry (1012) to read MBR data using regular read operations, in accordance with some embodiments. Storage device (1030) is similar to storage device (103) of FIG. 1.

Read circuitry (1012) is configured to read user data and MBR data that is stored in non-volatile storage media (109). In some cases, hardware exceptions (1014) are triggered by read circuitry (1012) and/or controller (107). If a hardware exception (1014) is triggered, then one or more processes are implemented by firmware (104). In one example, these processes include address translation to an MBR region of an MBR-enabled namespace (e.g., MBR region (308) of FIG. 3) for read commands from host (101) for an address in an MBR address range (e.g., MBR address range (306) of FIG. 3).

Non-volatile storage media (109) can be assigned to one or more namespaces. A master boot record can be enabled or disabled for any of the namespaces. If the master boot record is enabled for a namespace, then read commands from host (101) for an address in an MBR address range of the namespace are handled by one of hardware exceptions (1014). If the master boot record is disabled for the namespace, then read commands from host (101) for an address in the MBR address range are handled by read circuitry (1012) without use of any hardware exceptions (1014).

Figure 11:
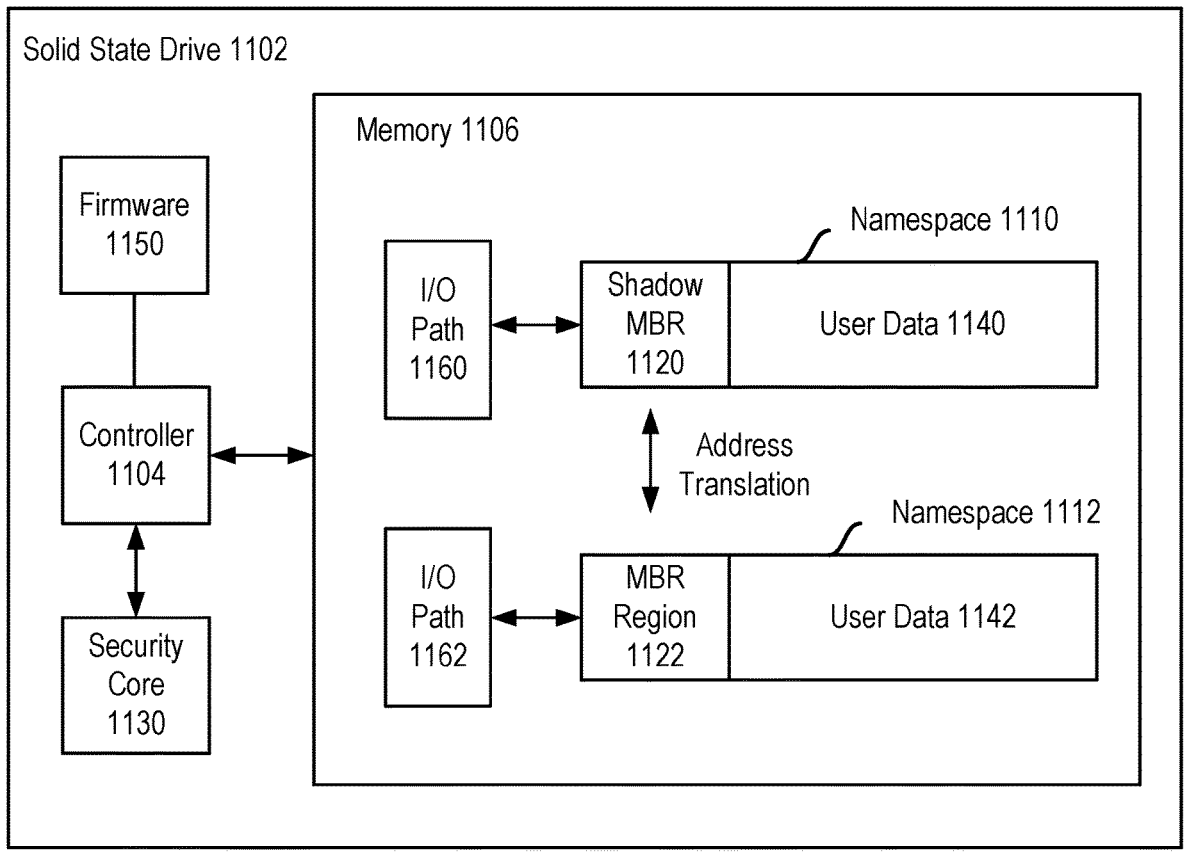
FIG. 11 shows a solid-state drive (SSD) having a master boot record that is read using a regular read operation, in accordance with some embodiments.

FIG. 11 shows a solid-state drive (SSD) (1102) having a master boot record that is read using a regular read operation, in accordance with some embodiments. SSD (1102) has memory (1106) allocated to namespace (1110) and namespace (1112). Memory (1106) is an example of non-volatile storage media (109) of FIG. 10.

Controller (1104) performs various access operations (e.g., read, write) on memory (1106). These access operations include reading data stored in memory (1106). For example, controller (1104) receives read commands from a host device (e.g., host (101)). In response to these read commands, read circuitry (e.g., read circuitry (1012) of FIG. 10) includes input/output (I/O) paths (1160, 1162) used to read user data or MBR data from memory (1106). Controller (1104) is an example of controller (107) of FIG. 10. In one embodiment, the master boot record includes MBR data stored in MBR region (1122). I/O paths (1160, 1162) include, for example, word line and bit line decoders used to access memory cells of memory (1106), and sensing circuitry (e.g., sense amplifiers) used to determine a logic state of each accessed memory cell.

For various commands (e.g., at least a portion of read commands) received from the host device, controller (1104) sends a request to security core (1130). In response to the request, security core (1130) provides an indication of an action to be taken in response receiving the command. In one example, the request includes a namespace and an address associated with the received command. In one example, controller (1104) sends read commands to security core (1130) for any read command having an address falling within an MBR address range. In one example, security core (1130) is similar to, or the same as, security core (830) of FIG. 8.

In some cases for reads to an MBR-enabled namespace, after controller (1104) receives a read command from the host device, a hardware exception is triggered which causes execution of one or more processes by firmware (1150). In one example, a hardware exception (1014) is handled by firmware (104) of FIG. 10. In one example, a hardware exception is handled by firmware (1150) (e.g., a slow path) for any read command having an address falling within an MBR address range of a namespace in memory (1106) for which a master boot record is enabled. In contrast, if the master boot record is disabled (not enabled) for the namespace, then the hardware exception is not triggered, and the read operation is handled using a regular read operation (e.g., a fast path having a read latency less than the slow path by at least 300-800 nanoseconds).

Namespace (1110) stores user data (1140). In one example, user data (1140) is stored in response to write commands received from a host device (not shown). Namespace (1110) includes shadow MBR (1120), which corresponds to MBR data assigned to namespace (1110). Read commands received to an address in namespace (1110) that correspond to shadow MBR (1120) are translated to an address in an MBR region.

In one example, the address translation is performed by shifting an address received with the read command to a corresponding address in MBR region (1122). In one example, the address translation is performed by adding an offset to an address received with the read command to provide an address to the MBR data in MBR region (1122). In one example, firmware (1150) performs the shifting of the address, and/or the adding of the offset to the address.

In one embodiment, the MBR region is MBR region (1122) of namespace (1112). In one embodiment, the MBR region is a dedicated memory location that is separate from (e.g., outside of) any namespace of memory (1106). In one embodiment, the MBR region can be stored in a portion of namespace (1110) that is not used for user data (1140).

Namespace (1112) stores user data (1142). In one embodiment, user data (1142) is stored in response to write commands received from the same host device that uses data stored in namespace (1110). In one embodiment, user data (1142) is stored in response to commands received from a different host device (not shown).

In response to a read command having an address corresponding to user data (1140), data is read from namespace (1110) using I/O path (1160) as part of a regular read operation by controller (1104). In response to read command having address corresponding to user data (1142), data is read from namespace (1112) using I/O path (1162) as part of a regular read operation by controller (1104).

In response to a read command having an address corresponding to shadow MBR (1120), and the corresponding master boot record is disabled for namespace (1110), MBR data is read from MBR region (1122) using I/O path (1162) as part of a regular read operation. No hardware exception is triggered as part of this read operation.

In one example, a master boot record is disabled for namespace (304) of FIG. 3. A read command is received from a host device that has an address (e.g., LBAs 0-2) falling in MBR address range (306). Controller (1104) translates the address to an address in MBR region (308). MBR data is read from LBAs (100-102) using a regular read operation without triggering any hardware exception. In one example, the MBR data is read using I/O path (1162).

In one example, user data (1140) of namespace (1110) includes user data (410-420) having addresses (450) of FIG. 4. In one example, MBR region (1122) includes MBR data (610-620) of FIG. 6.

In one embodiment, a latency for reading user data in response to a first read command from a host device is within 50 to 300 nanoseconds (ns) of a latency for reading MBR data in response to a second read command from the host device. For example, the latency for reading user data (1140) is within 50 to 300 nanoseconds of the latency for reading MBR data from MBR region (1122). The user data (1140) is read using I/O path (1160), and the MBR data is read using I/O path (1162). In each case, the data is read using a regular read operation of controller (1104) (e.g., without triggering any hardware exception (1014)).

In one embodiment, memory (1106) is allocated to namespace (1110). Memory (1106) is formatted to have a sector size (e.g., 4K bytes per sector). Read circuitry (e.g., 1012 of FIG. 10) is configured to read user data (1140). MBR data is stored in a master boot record assigned to namespace (1110). The format of the master boot record is the same size (e.g., 4K bytes per sector) as the sector size of namespace (1110). A read command is received from a host device for an address in namespace (1110) that is within an address range corresponding to the master boot record. In response to receiving the read command, controller (1104) reads the MBR data using read circuitry (e.g., 1012). The address of the MBR data is determined using the address received from the host device with the read command. After reading the MBR data, the MBR data is sent to the host device.

Figure 12:
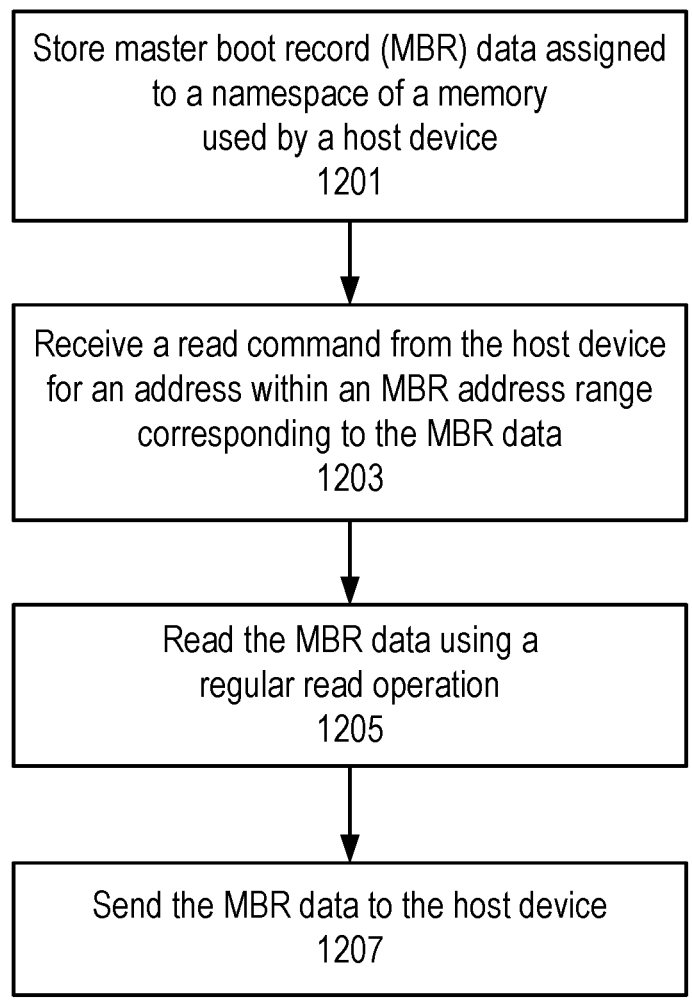
FIG. 12 shows a method for reading a master boot record using a regular read operation, in accordance with some embodiments.

FIG. 12 shows a method for reading a master boot record using a regular read operation, in accordance with some embodiments. For example, the method of FIG. 12 can be implemented in the system of FIG. 10. In one example, the master boot record is stored in MBR region (1122) of FIG. 11.

The method of FIG. 12 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 12 is performed at least in part by one or more processing devices (e.g., controller (1104) of FIG. 11).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block (1201), MBR data is stored in a memory used by a host device. The MBR data is assigned to a namespace of the memory. In one example, the MBR data is stored in MBR region (1122). In one example, the MBR data is assigned to namespace (1110) of memory (1106).

At block (1203), a read command is received from the host device. The read command is for an address within an MBR address range of the namespace that corresponds to the stored MBR data. In one example, the read command is received by controller (1104). In one example, the read command is for an address within an address range corresponding to shadow MBR (1120).

At block (1205), the MBR data is read using a regular read operation. In one example, the MBR data is read using a regular read operation of controller (1104). In one example, the MBR data is read using I/O path (1162).

At block (1207), the MBR data is sent to the host device. In one example, the MBR data is sent by controller (107) to host (101) of FIG. 10.

In one embodiment, a method comprises: storing, in a memory (e.g., 1106) operated by a controller (e.g., 1104), master boot record (MBR) data in a master boot record that is assigned to a namespace (e.g., 1110) of the memory, wherein the controller reads user data from the namespace by read circuitry (e.g., read circuitry (1012) or I/O path (1160)) using regular read operations; receiving, by the controller from a host device (e.g., 101), a first read command for a first host address within an address range that corresponds to the master boot record; in response to receiving the first read command, reading first MBR data using the read circuitry (e.g., read circuitry (1012) or I/O path (1162)), wherein a first MBR address of the first MBR data is determined by translation from the first host address, and wherein the read circuitry is configured to read the first MBR data using a regular read operation of the read circuitry; and sending the first MBR data to the host device.

In one embodiment, the method further comprises: enabling the master boot record for the namespace; after enabling the master boot record, receiving, by the controller from the host device, a second read command for a second host address within the address range that corresponds to the master boot record; in response to receiving the second read command, using a hardware exception (e.g. hardware exceptions (1014)) implemented by firmware (e.g., 104) to read second MBR data from the master boot record, wherein a second MBR address of the second MBR data is determined by the firmware using translation from the second host address; and sending the second MBR data to the host device.

In one embodiment, the method further comprises: disabling the master boot record for the namespace; after disabling the master boot record, receiving, by the controller from the host device, a third read command for a third host address within the address range that corresponds to the master boot record; in response to receiving the third read command, reading third MBR data using the read circuitry, wherein a third MBR address of the third MBR data is determined by translation from the third host address without using the hardware exception, and wherein the read circuitry is further configured to read the third MBR data using a regular read operation of the read circuitry; and sending the third MBR data to the host device.

In one embodiment, a system comprises: memory allocated to a first namespace, wherein the first namespace is formatted to have a first sector size; read circuitry configured to read user data stored in the first namespace; and a controller configured to: store master boot record (MBR) data in a master boot record that is assigned to the first namespace, wherein a format of the master boot record is the first sector size; receive a first read command from a host device, wherein the first read command is for a first address in the first namespace that is within an address range that corresponds to the master boot record; in response to receiving the first read command, read the MBR data using the read circuitry, wherein an address of the MBR data is determined using the first address; and send the read MBR data to the host device.

In one embodiment, determining the address of the MBR data comprises shifting the first address or adding an offset to the first address.

In one embodiment, the read circuitry is further configured to determine the address of the MBR data.

In one embodiment, the controller is further configured to execute firmware to handle hardware exceptions for at least a portion of read commands received from the host device; and the MBR data is read using the read circuitry as a regular read operation without executing the firmware to handle any hardware exception.

In one embodiment, the controller is further configured to read first user data in the first namespace in response to receiving a second read command from the host device; and the first user data is read using the read circuitry as a regular read operation.

In one embodiment, the MBR data is first MBR data, second MBR data is enabled for a second namespace, and handling the hardware exceptions includes executing a translation address service to translate addresses in the second namespace received with the portion of read commands to addresses for the second MBR data.

In one embodiment, the translation address service is for non-user data.

In one embodiment, the second namespace is formatted with a second sector size different from the first sector size.

In one embodiment, the controller is further configured to, in response to receiving the first read command, make a security request for approval to read the MBR data.

In one embodiment, the MBR data is written to an MBR region (MBR region (1122)) of the memory in response to receiving a secure command from the host device.

In one embodiment, a second namespace (e.g., 1112) is formatted to have the first sector size, and the master boot record is stored in the second namespace.

In one embodiment, the controller is further configured to: receive a second read command from the host device, wherein the second read command is for an address in the first namespace that is within the address range that corresponds to the master boot record; and determine that the master boot record is not enabled for the first namespace; wherein the read circuitry is selected for use in reading the MBR data based on determining that the master boot record is not enabled.

In one embodiment, each sector of the MBR data is a block formatted to the first sector size and having a logical block address (LBA).

In one embodiment, the controller is further configured to: for any command received from the host device, send a request to a security core, the request including a namespace corresponding to the command and an address corresponding to the command; and receive, from the security core (e.g., 1130), an indication of an action to be taken in response to receiving the command.

In one embodiment, the address corresponding to the command is in a logical block address (LBA) range associated with the master boot record, and the action is returning the MBR data to the host device.

In one embodiment, authentication of the host device by the security core is required prior to the security core approving access to the MBR data.

In one embodiment, a system comprises: memory allocated to at least one namespace, wherein the memory is configured to store user data in a first namespace, and further configured to store master boot record (MBR) data in an MBR region assigned to the first namespace; read circuitry configured to, in response to read commands received from a host device for addresses in the first namespace, read the user data or the MBR data; and a controller configured to: in response to a secure command received from the host device, write the MBR data to the MBR region; receive a first read command from the host device, wherein the first read command is for a first address in the first namespace that is within an address range that corresponds to the MBR region; in response to receiving the first read command, read the MBR data using the read circuitry; and send the read MBR data to the host device.

In one embodiment, the MBR region is outside of the first namespace.

In one embodiment, the first namespace and the MBR region have a same sector size.

In one embodiment, the controller is further configured to: receive a second read command from the host device, wherein the second read command is for a second address in the first namespace that is within an address range that corresponds to the user data, and is outside of the address range that corresponds to the MBR region; in response to receiving the second read command, read first user data using the read circuitry; and send the read first user data to the host device.

In one embodiment, a latency for reading the first user data (e.g., using I/O path (1160)) is within 50 to 300 nanoseconds of a latency for reading the MBR data (e.g., using I/O path (1162)).

In one embodiment, the read circuitry is further configured to read either of the user data or the MBR data using a regular input/output (I/O) hardware path as part of read operations performed in response to the read commands from the host device.

In one embodiment, the controller is further configured to, in response to receiving any read command in an address range that corresponds to the MBR region, make a security request for approval to access the MBR region.

In one embodiment, the controller is further configured to, in response to receiving the first read command, translate the first address in the first namespace to an address in the MBR region.

In one embodiment, the address range that corresponds to the MBR region is a first 128 MB or 256 MB of the first namespace.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
  memory allocated to a first namespace, wherein the first namespace is formatted to have a first sector size;

read circuitry configured to read user data stored in the first namespace; and a controller configured to:
store master boot record (MBR) data in a master boot record that is assigned to the first namespace, wherein a format of the master boot record is the first sector size;
receive a first read command from a host device, wherein the first read command is for a first address in the first namespace that is within an address range that corresponds to the master boot record;
in response to receiving the first read command, read the MBR data using the read circuitry, wherein an address of the MBR data is determined using the first address;
and
send the read MBR data to the host device, wherein the MBR data is read using the read circuitry as a regular read operation without executing the firmware to handle any hardware exception.

2. The system of claim 1, wherein determining the address of the MBR data comprises shifting the first address or adding an offset to the first address.

3. The system of claim 1, wherein the read circuitry is further configured to determine the address of the MBR data.

4. The system of claim 1, wherein:
the controller is further configured to execute firmware to handle hardware exceptions for at least a portion of read commands received from the host device.

5. The system of claim 4, wherein:
the controller is further configured to read first user data in the first namespace in response to receiving a second read command from the host device; and
the first user data is read using the read circuitry as a regular read operation.

6. The system of claim 4, wherein the MBR data is first MBR data, second MBR data is enabled for a second namespace, and handling the hardware exceptions includes executing a translation address service to translate addresses in the second namespace received with the portion of read commands to addresses for the second MBR data.

7. The system of claim 6, wherein the translation address service is for non-user data.

8. The system of claim 6, wherein the second namespace is formatted with a second sector size different from the first sector size.

9. The system of claim 1, wherein the controller is further configured to, in response to receiving the first read command, make a security request for approval to read the MBR data.

10. The system of claim 1, wherein the MBR data is written to an MBR region of the memory in response to receiving a secure command from the host device.

11. The system of claim 1, wherein a second namespace is formatted to have the first sector size, and the master boot record is stored in the second namespace.

12. The system of claim 1, wherein the controller is further configured to:
receive a second read command from the host device, wherein the second read command is for an address in the first namespace that is within the address range that corresponds to the master boot record; and
determine that the master boot record is not enabled for the first namespace;
wherein the read circuitry is selected for use in reading the MBR data based on determining that the master boot record is not enabled.

13. The system of claim 1, wherein each sector of the MBR data is a block formatted to the first sector size and having a logical block address (LBA).

14. The system of claim 1, wherein the controller is further configured to:
for any command received from the host device, send a request to a security core, the request including a namespace corresponding to the command and an address corresponding to the command; and
receive, from the security core, an indication of an action to be taken in response to receiving the command.

15. The system of claim 14, wherein the address corresponding to the command is in a logical block address (LBA) range associated with the master boot record, and the action is returning the MBR data to the host device.

16. The system of claim 14, wherein authentication of the host device by the security core is required prior to the security core approving access to the MBR data.

17. A system comprising:
memory allocated to at least one namespace, wherein the memory is configured to store user data in a first namespace, and further configured to store master boot record (MBR) data in an MBR region assigned to the first namespace;
read circuitry configured to, in response to read commands received from a host device for addresses in the first namespace, read the user data or the MBR data; and
a controller configured to:
in response to a secure command received from the host device, write the MBR data to the MBR region;
receive a first read command from the host device, wherein the first read command is for a first address in the first namespace that is within an address range that corresponds to the MBR region;
in response to receiving the first read command, read the MBR data using the read circuitry;
send the read MBR data to the host device, wherein the MBR data is read using the read circuitry as a regular read operation without executing the firmware to handle any hardware exception;
for any command received from the host device, send a request to a security core, the request including a namespace corresponding to the command and an address corresponding to the command.

18. The system of claim 17, wherein the MBR region is outside of the first namespace.

19. The system of claim 17, wherein the first namespace and the MBR region have a same sector size.

20. The system of claim 17, wherein the controller is further configured to:
receive a second read command from the host device, wherein the second read command is for a second address in the first namespace that is within an address range that corresponds to the user data, and is outside of the address range that corresponds to the MBR region;
in response to receiving the second read command, read first user data using the read circuitry; and
send the read first user data to the host device.

21. The system of claim 20, wherein a latency for reading the first user data is within 50 to 300 nanoseconds of a latency for reading the MBR data.

22. The system of claim 17, wherein the read circuitry is further configured to read either of the user data or the MBR data using a regular input/output (I/O) hardware path as part of read operations performed in response to the read commands from the host device.

23. The system of claim 17, wherein the controller is further configured to, in response to receiving any read command in an address range that corresponds to the MBR region, make a security request for approval to access the MBR region.

24. The system of claim 17, wherein the controller is further configured to, in response to receiving the first read command, translate the first address in the first namespace to an address in the MBR region.

25. The system of claim 17, wherein the address range that corresponds to the MBR region is a first 128 MB or 256 MB of the first namespace.

26. A method comprising:
  storing, in a memory operated by a controller, master boot record (MBR) data in a master boot record that is assigned to a namespace of the memory, wherein the controller reads user data from the namespace by read circuitry using regular read operations;
  receiving, by the controller from a host device, a first read command for a first host address within an address range that corresponds to the master boot record;
  in response to receiving the first read command, reading first MBR data using the read circuitry, wherein a first MBR address of the first MBR data is determined by translation from the first host address, and wherein the read circuitry is configured to read the first MBR data using a regular read operation of the read circuitry;
  sending the first MBR data to the host device;
  in response to receiving the second read command, using a hardware exception implemented by firmware to read second MBR data from the master boot record, wherein a second MBR address of the second MBR data is determined by the firmware using translation from the second host address; and
  sending the second MBR data to the host device.

27. The method of claim 26, further comprising:
  enabling the master boot record for the namespace; and
  after enabling the master boot record, receiving, by the controller from the host device, a second read command for a second host address within the address range that corresponds to the master boot record.

28. The method of claim 27, further comprising:
  disabling the master boot record for the namespace;
  after disabling the master boot record, receiving, by the controller from the host device, a third read command for a third host address within the address range that corresponds to the master boot record;
  in response to receiving the third read command, reading third MBR data using the read circuitry, wherein a third MBR address of the third MBR data is determined by translation from the third host address without using the hardware exception, and wherein the read circuitry is further configured to read the third MBR data using a regular read operation of the read circuitry; and
  sending the third MBR data to the host device.

* * * * *